United States Patent
Fortin et al.

(10) Patent No.: US 10,562,659 B2
(45) Date of Patent: Feb. 18, 2020

(54) HEAT SEALABLE BARRIER COATINGS FOR PAPERBOARD

(71) Applicant: Georgia-Pacific Bleached Board LLC, Atlanta, GA (US)

(72) Inventors: Lori Jeanne Fortin, Peachtree Corners, GA (US); Kathryn Lynn Veith, Neenah, WI (US)

(73) Assignee: Georgia-Pacific Bleached Board LLC, Atlanta, GA (US)

( * ) Notice: Subject to any disclaimer, the term of this patent is extended or adjusted under 35 U.S.C. 154(b) by 154 days.

(21) Appl. No.: 15/698,772

(22) Filed: Sep. 8, 2017

(65) Prior Publication Data

US 2019/0077537 A1 Mar. 14, 2019

(51) Int. Cl.
*B65D 3/04* (2006.01)
*B65D 3/28* (2006.01)
*C09D 127/08* (2006.01)
*C09D 133/02* (2006.01)

(52) U.S. Cl.
CPC .............. *B65D 3/28* (2013.01); *B65D 3/04* (2013.01); *C09D 127/08* (2013.01); *C09D 133/02* (2013.01)

(58) Field of Classification Search
CPC .. B65D 81/3874; B65D 25/2847; B65D 3/04; B65D 5/42; B65D 81/3823; B65D 3/12; B65D 3/22; B65D 3/00; B31B 2105/001
See application file for complete search history.

(56) References Cited

U.S. PATENT DOCUMENTS

| | | | |
|---|---|---|---|
| 3,753,769 A | 8/1973 | Steiner | |
| 4,058,645 A | 11/1977 | Steiner | |
| 4,439,493 A | 3/1984 | Hein et al. | |
| 5,096,650 A * | 3/1992 | Renna | B31F 1/0077 264/322 |
| 5,766,709 A * | 6/1998 | Geddes | B65D 3/14 220/902 |
| 5,837,383 A | 11/1998 | Wenzel et al. | |
| 6,085,970 A * | 7/2000 | Sadlier | B65D 3/22 229/198.2 |
| 6,116,503 A * | 9/2000 | Varano | B65D 3/06 229/402 |

(Continued)

FOREIGN PATENT DOCUMENTS

JP H02269645 A 11/1990

OTHER PUBLICATIONS

PCT International Search Report and Written Opinion for PCT/US2018/049555 dated Dec. 6, 2018.

*Primary Examiner* — Brian D Nash

(57) ABSTRACT

A paperboard blank and cup made therefrom are provided. The blank includes a paperboard substrate having a first side and a second side. A first polymer layer can be disposed on at least a portion of the first side of the paperboard substrate, and a second polymer layer can be disposed on at least a portion of the second side of the paperboard substrate. Both the first and second polymer layers can include at least one polymer component that is thermoplastic. The second polymer layer further comprises at least one polymer component, which is not present in the first polymer layer, and has a glass transition temperature higher than all the polymer components of the first polymer layer.

28 Claims, 1 Drawing Sheet

(56) References Cited

U.S. PATENT DOCUMENTS

| | | | |
|---|---|---|---|
| 6,129,653 A * | 10/2000 | Fredricks | B29C 44/12 493/110 |
| 6,224,954 B1 * | 5/2001 | Mitchell | B32B 27/10 428/34.2 |
| 6,231,970 B1 * | 5/2001 | Andersen | C08L 3/02 106/145.1 |
| 6,257,485 B1 * | 7/2001 | Sadlier | B65D 3/22 229/198.2 |
| 6,364,201 B1 * | 4/2002 | Varano | B65D 3/06 229/198.2 |
| 6,740,373 B1 | 5/2004 | Swoboda | |
| 6,884,479 B2 | 4/2005 | Chu et al. | |
| 8,067,087 B2 | 11/2011 | Katchko et al. | |
| 8,113,416 B2 | 2/2012 | Yan | |
| 9,114,900 B2 | 8/2015 | Hougland et al. | |
| 9,200,409 B2 | 12/2015 | Hartmann et al. | |
| 9,656,793 B2 * | 5/2017 | Leser | A47G 19/2288 |
| 2002/0022096 A1 * | 2/2002 | Curtis | B32B 27/10 428/34.2 |
| 2002/0172818 A1 * | 11/2002 | DeBraal | B29C 48/08 428/318.4 |
| 2002/0182347 A1 * | 12/2002 | DeBraal | B29C 44/12 428/34.2 |
| 2003/0003249 A1 * | 1/2003 | Benim | B65D 23/0878 428/35.7 |
| 2003/0003251 A1 * | 1/2003 | DeBraal | B29C 48/08 428/36.5 |
| 2003/0057590 A1 * | 3/2003 | Loher | A61B 17/866 264/157 |
| 2006/0057365 A1 * | 3/2006 | Swoboda | B32B 29/06 428/323 |
| 2006/0099410 A1 | 5/2006 | Miller | |
| 2006/0131317 A1 * | 6/2006 | Bresler | B65D 81/3874 220/737 |
| 2006/0148628 A1 * | 7/2006 | Lorenz | C09J 123/0853 493/68 |
| 2006/0226576 A1 * | 10/2006 | O'Brien | B01L 3/502707 264/293 |
| 2008/0023538 A1 * | 1/2008 | Robertson | B65D 81/3874 229/403 |
| 2010/0006206 A1 * | 1/2010 | Chang | B29C 44/1271 156/79 |
| 2011/0046284 A1 | 2/2011 | Berube et al. | |
| 2011/0081509 A1 * | 4/2011 | Chang | B65D 65/466 428/34.2 |
| 2011/0240064 A1 * | 10/2011 | Wales | C09D 5/14 134/26 |
| 2012/0302660 A1 | 11/2012 | Stanssens et al. | |
| 2012/0318805 A1 * | 12/2012 | Leser | B65D 3/14 220/592.17 |
| 2014/0113790 A1 | 4/2014 | Files et al. | |
| 2015/0050446 A1 | 2/2015 | Stamp | |
| 2016/0194138 A1 * | 7/2016 | Saitaka | B65D 81/3874 229/403 |
| 2016/0230343 A1 | 8/2016 | Pang et al. | |
| 2018/0016052 A1 * | 1/2018 | Tomioka | B65D 3/22 |
| 2018/0228314 A1 * | 8/2018 | Putnam | B65D 21/0201 |
| 2018/0245291 A1 * | 8/2018 | Pang | D21H 19/385 |
| 2019/0047265 A1 * | 2/2019 | Euler | A47G 19/2288 |
| 2019/0077537 A1 * | 3/2019 | Fortin | D21H 27/18 |

\* cited by examiner

HEAT SEALABLE BARRIER COATINGS FOR PAPERBOARD

BACKGROUND

Field

Embodiments described generally relate to paperboard blanks for paper products, methods for making same, and paperboard products therefrom. More particularly, embodiments described generally relate to cup stock.

Description of the Related Art

Fibrous substrates, such as paper and paperboard, are used in food service applications to make a wide variety of paper products, such as plates, bowls, and cups. Some specific uses require a heat-seal step in the converting operation such as paper products used in canister applications. Products resulting from paper and paperboard can have poor resistance to water, gases, oils, solvents and greases unless treated to improve the barrier properties of the paper. For example, to improve the water resistance properties of paperboard used to make disposable cups, the paperboard is typically coated with a hot-melt extruded polyethylene on one or both sides of the paperboard stock. For hot applications, the polyethylene layer is disposed on the inside of the cup and bonded to bare or clay-coated paperboard on the opposite side. For cold applications, the outside of the cup needs to be water resistant to prevent damage of the paperboard by condensation, so the outside is also coated with polyethylene, and the two polyethylene surfaces are heat sealed together at the side seam. The bottom stock is similarly matched such that a polyethylene coated paperboard surface is heat sealed to the inside surface of the cupstock, which is also polyethylene coated.

Although polyethylene coatings serve as good water barriers and are fairly inexpensive, there is a continuous effort to develop alternatives to melt extruded polyethylene, particularly for paper cups. For example, a liquid-based polymeric dispersion or emulsion is an alternative to melt extruded polyethylene. A particular motivation of applying the barrier in the form of a liquid-based polymeric dispersion or emulsion, and then drying to form a continuous film, is related to sustainability. Less material may be used, as stability requirements pertaining to the extruded melt curtain are obviated. Dispersion-coated barriers are also generally more repulpable and hence more recyclable than extrusion-coated barriers.

SUMMARY

A paperboard blank, cups made from the blanks, and methods for making the same are provided. The blank includes a paperboard substrate having a first side and a second side. A first polymer layer can be disposed on at least a portion of the first side of the paperboard substrate, and a second polymer layer can be disposed on at least a portion of the second side of the paperboard substrate. Both the first and second polymer layers can include at least one polymer component that is thermoplastic. The second polymer layer further comprises at least one polymer component, which is not present in the first polymer layer, and has a glass transition temperature higher than all the polymer components of the first polymer layer. The blanks can be used to make cups or other beverage containers.

The cup can include a sidewall having a first side and a second side, wherein a first polymer layer is disposed on at least a portion of the first side of the sidewall, and a second polymer layer is disposed on at least a portion of the second side of the sidewall. Both the first and second polymer layers can include at least one polymer component that is thermoplastic. The second polymer layer further includes a polymer component that is not present in the first polymer layer and that has a glass transition temperature higher than the polymer components of the first polymer layer.

DETAILED DESCRIPTION

Figure 1:
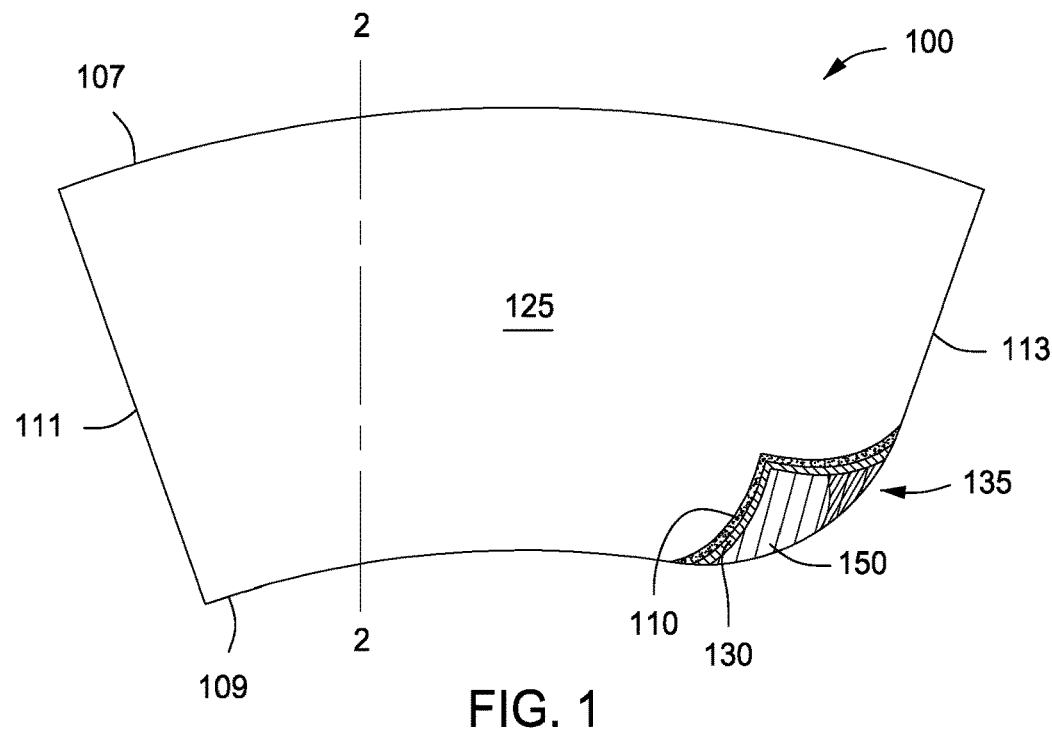
FIG. 1 depicts a schematic view of an illustrative blank, according to one or more embodiments described.

It has been surprisingly discovered that a coated paperboard having differing polymer layers where one side of the paperboard has at least one polymer component, which is not present in the other side, and has a glass transition temperature (Tg) higher than the polymer component(s) of the other side provides a superior heat seal compared to paperboards coated on both sides with polymer compositions having similar Tgs. More surprisingly, it was found that when dealing with thermoplastics on a paperboard surface, the opposing surface exhibits significantly more efficient heat seal behavior when blended with a second thermoplastic, which is not present in the opposing surface, and more particularly a second thermoplastic that has a higher glass transition temperature (Tg) than the thermoplastic(s) of the other side.

As used herein, the term "glass transition temperature" refers to the temperature (Tg), as measured according to ASTM D3418, at which a thermoplastic transitions from a hard and relatively brittle "glassy" state into a viscous or rubbery state. The glass transition temperature (Tg) is lower than the melting temperature (Tm) of the crystalline state of the thermoplastic.

By "thermoplastic polymer(s)" is meant a polymer that can be melted by heat and then cooled without appreciable change in properties. Thermoplastic polymers typically include, but are not limited to, styrenics, acrylates, methacrylates, vinyls, polyhaloolefins, polyolefins, polyamides, polyesters, polycarbonates, polysulfones, polyacetals, polylactones, acrylonitrile-butadiene-styrene resins, polyphenylene oxide, polyphenylene sulfide, stryene-acrylic, styrene-butadiene, styrene-acrylonitrile resins, styrene maleic anhydride, polyimides, aromatic polyketones, or copolymers or mixtures of any two or more of the above. A preferred polyhaloolefin is polyvinylidene chloride.

A suitable thermoplastic polymer can be or can include acrylic acid or its derivatives and salts. For example, suitable polymers may include any one or more of the following: polyacrylics and polyacrylic acids such as poly(benzyl acrylate), poly(butyl acrylate)(s), poly(2-cyanobutyl acrylate), poly(2-ethoxyethyl acrylate), poly(ethyl acrylate), poly(2-ethylhexyl acrylate), poly(fluoromethyl acrylate), poly(5,5,6,6,7,7,7-heptafluoro-3-oxaheptyl acrylate), poly(heptafluoro-2-propyl acrylate), poly(heptyl acrylate), poly(hexyl acrylate), poly(isobornyl acrylate), poly(isopropyl acrylate), poly(3-methoxybutyl acrylate), poly(methyl acrylate), poly(nonyl acrylate), poly(octyl acrylate), poly(propyl acrylate), poly(p-tolyl acrylate), poly(acrylic acid) and derivatives and salts thereof; polyacrylamides such as poly(acrylamide), poly(N-butylacrylamide), poly(N,N-dibutylacrylamide), poly(N-dodecylacrylamide), and poly(morpholylacrylamide); polymethacrylic acids and poly(methacrylic acid esters) such as poly(benzyl methacrylate), poly(octyl methacrylate), poly(butyl methacrylate), poly(2-chloroethyl methacrylate), poly(2-cyanoethyl methacrylate), poly(dodecyl methacrylate), poly(2-ethylhexyl methacrylate), poly(ethyl methacrylate), poly(1,1,1-trifluoro-2-propyl methacrylate), poly(hexyl methacrylate), poly(2-hydroxyethyl methacrylate), poly(2-hydroxypropyl methacrylate), poly(isopropyl methacrylate), poly(methacrylic acid), poly(methyl methacrylate) in various forms such as, atactic, isotactic, syndiotactic, and heterotactic; and poly(propyl methacrylate); polymethacrylamides such as poly(4-carboxyphenylnethacrylamide); other alpha- and beta-substituted poly(acrylics) and poly(methacrylics) such as poly(butyl chloracrylate), poly(ethyl ethoxycarbonylmethacrylate), poly(methyl fluoroacrylate), and poly(methyl phenylacrylate).

Illustrative thermoplastic polymers may also contain one or more polyolefins, including polyolefin homopolymers and polyolefin copolymers. Illustrative polyolefins may be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Illustrative polyolefins can also include polymers comprising one or more linear, branched or cyclic C2 to C40 olefins, preferably polymers comprising propylene copolymerized with one or more C3 to C40 olefins, preferably a C3 to C20 alpha olefin, more preferably C3 to C10 alpha-olefins. Polyolefins can also include polymers comprising ethylene including but not limited to ethylene copolymerized with a C3 to C40 olefin, preferably a C3 to C20 alpha olefin, more preferably propylene and or butene. Except as stated otherwise, the term "copolymer" means a polymer derived from two or more monomers (including terpolymers, tetrapolymers, etc.), and the term "polymer" refers to any carbon-containing compound having repeat units from one or more different monomers.

Certain examples are shown in the provided figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

Figures 2, 3:
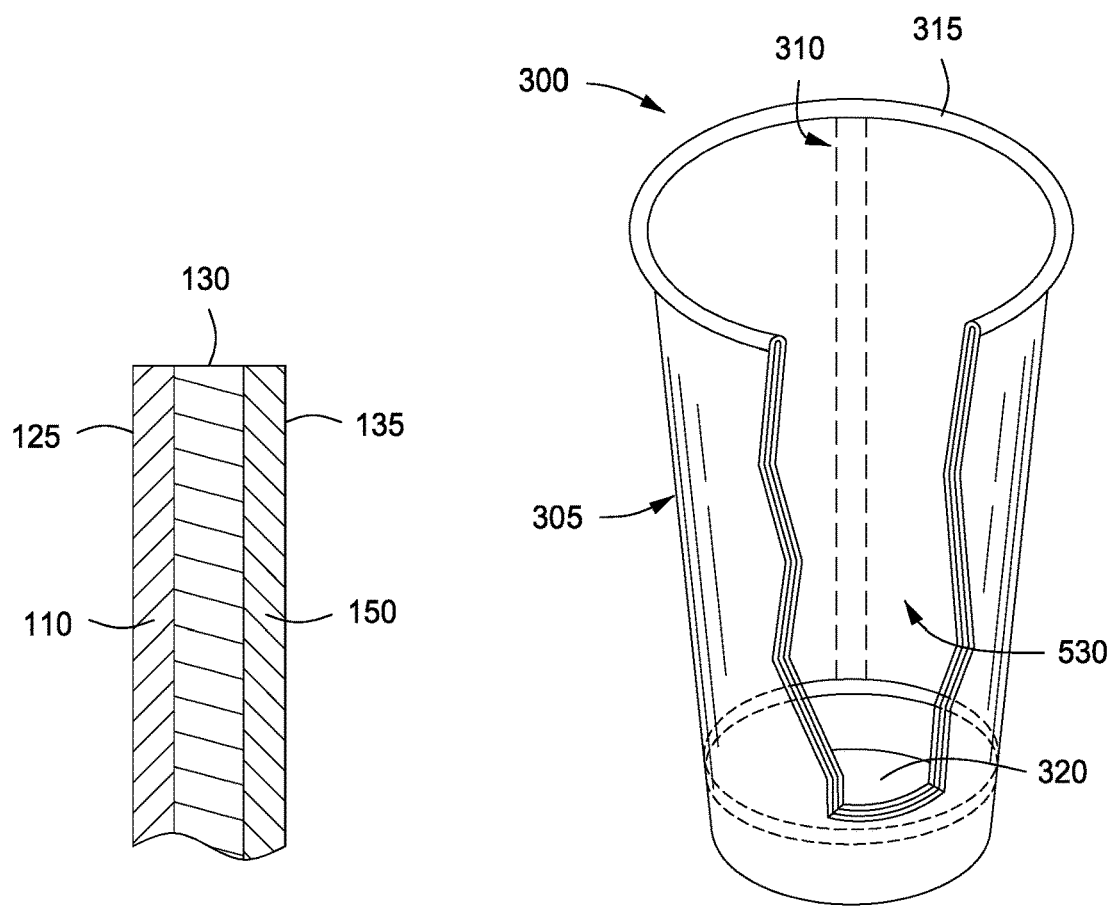
FIG. 2 depicts a schematic cross-sectional view of the blank depicted in FIG. 1 along line 2-2, according to one or more embodiments described.
FIG. 3 depicts a partial cut away, perspective view of an illustrative paper cup, according to one or more embodiments described.

FIG. 1 depicts a schematic view of an illustrative blank 100, according to one or more embodiments, and FIG. 2 depicts a schematic cross-sectional view along line 2-2 of the blank 100 depicted in FIG. 1. The coated paperboard 100 can include a first polymer layer 110 disposed on at least a portion of a first side 125 of a paperboard substrate 130, and a second polymer layer 150 disposed on at least a portion of a second side 135 of the paperboard substrate 130. In another embodiment, the coated paperboard 100 can include a first polymer layer 110 disposed on at least a portion of the first side 125 of the paperboard substrate 130, and the second side 135 of the paperboard substrate 130 could be bare. Each polymer layer 110, 150 can be one or more individual layers or films, each having a thickness ranging from a low of about 0.002 mm, about 0.005 mm, about 0.01 mm, about 0.03 mm, about 0.05 mm, about 0.07 mm, or about 0.1 mm to a high of about 0.15 mm, about 0.17 mm, about 0.2 mm, about 0.25 mm, about 0.3 mm, or about 0.35 mm.

The one or more first and second polymer layers 110, 150 can be disposed on either side of the paperboard substrate 130 using any suitable process, including dip-coating, rod coating, blade coating, gravure and reverse-roll coating, slide coating, bead coating, extrusion coating, curtain coating and the like. Other suitable coating methods include, but are not limited to, wound wire rod coating, slot coating, slide hopper coating, gravure, curtain coating and the like. Some of these methods allow for simultaneous coatings of two or more layers, which is preferred from a manufacturing economic perspective. Additional coating techniques and drying methods are described in further detail in U.S. Pat. No. 6,884,479. After coating, the layers can be dried by simple evaporation, which can be accelerated using known techniques, such as convection heating, for example.

Each polymer layer 110, 150 can include any number of polymer components. Each polymer layer 110, 150 can include one or more thermoplastic polymer components to provide sufficient liquid resistance properties to the paperboard 100. The first and second polymer layers 110, 150 can otherwise be the same except that the second polymer layer 150 is a blend of two or more polymer components having different glass transition temperatures—one glass transition temperature for each component. The blend in the second polymer layer 150 includes at least one polymer component, which is not present in the first polymer layer 110, and has a glass transition temperature higher than the polymer component(s) of the first polymer layer 110. Said another way, the second polymer layer 150 can have at least one polymer component, which is not found in the first polymer layer 130, and that has a glass transition temperature higher than all the glass transition temperatures of each polymer component of the first polymer layer 110.

In certain embodiments, each polymer component in the polymer layers 110, 150 can have a glass transition temperature that ranges from a low of about −20° F., about 0° F., or about 50° F. to a high of about 80° F., 120° F., or 160° F. Each component in the polymer layers 110, 150 also can have a glass transition temperature that ranges from about −20° F. to about 200° F.; about −20° F. to about 50° F.; about −20° F. to about 38° F.; about −10° F. to about 80° F.; about 0° F. to about 150° F.; or about 50° F. to about 280° F. In certain embodiments, the glass transition temperature of each polymer component in both polymer layers 110, 150 is less than room temperature (e.g. less than 78° F./25° C.). In certain embodiments, the glass transition temperature of the polymer component(s) in the first polymer layer 110 is less than room temperature (e.g. less than 78° F./25° C.). In certain embodiments, the glass transition temperature of the polymer component(s) in the first polymer layer 110 is approximately or more than room temperature (e.g. less than 78° F./25° C.). In certain embodiments, the glass transition temperature of each polymer component in the second polymer layer 150 can be less than 32° F., about 66° F., or about 86° F. In certain embodiments, the glass transition temperature of each polymer component in the first polymer layer 110 can be less than 32° F., about 60° F., about 90° F., or about 140° F.

The difference between the highest glass transition temperature component in the first polymer layer 110 and that in the second polymer layer 150 (Highest Polymer Component Tg of second layer 150 minus Highest Polymer Component Tg of first layer 110) can be at least 10° F., 15° F., or 20° F., or more. This differential also can be referred to as "Tg Differential". The Tg Differential can be about 5° F., about 10° F., about 15° F., about 18° F., about 25° F., or about 27° F. The Tg Differential also can range from a low of about 5° F., 10° F., 15° F., or 20° F. to a high of about 40° F., 70° F., or 100° F. The Tg Differential also can be 5° F. to 30° F., 10° F. to 150° F.; 15° F. to 125° F.; 10° F. to 70° F.; or 32° F. to 83° F.

Surface Treatment for Substrates

One or both of the outer surfaces of the paperboard, prior to application of the polymer layers 110, 150, can be surface-treated to increase the surface energy to render the paperboard surface more receptive to metallization, coatings, printing inks, and/or lamination. The surface treatment can be carried out according to one of the methods known in the art including corona discharge, flame, plasma, chemical treatment, or treatment by means of a polarized flame.

Before applying a top coating, to the outer surface, the surface to be coated can be further treated to increase its surface energy. For example, the surface to be coated can be treated using flame treatment, plasma, corona discharge, film chlorination (e.g., exposure of the film surface to gaseous chlorine), treatment with oxidizing agents such as chromic acid, hot air or steam treatment, flame treatment and the like. Although any of these techniques can be effectively employed to pre-treat the surface, a preferred method can be corona discharge, an electronic treatment method that includes exposing the surface to a high voltage corona discharge while passing the film between a pair of spaced electrodes. After treatment of the surface, the polymer layers 110, 150 can be then applied thereto.

In one or more embodiments, a primer coating can be applied as a top coating to one or more surfaces of the substrate. The primer can be applied to a surface before application of the polymer layers 110, 150 or before application of another top coating. When a primer is to be applied, the underlying surface can be treated by one of the foregoing methods.

Suitable primer materials are well known in the art and include, for example, epoxy and poly(ethylene imine) (PEI) materials. U.S. Pat. Nos. 3,753,769, 4,058,645 and 4,439,493, each incorporated herein by reference, disclose the use and application of such primers. The primer provides an overall adhesively active surface for thorough and secure bonding with the subsequently applied polymer layers and can be applied to the substrate by conventional solution coating means, for example, by roller application.

A preferred surface treatment underneath the heat-sealable barrier layer(s) is a size-press coating (mostly starch, but can also have polyvinyl alcohol, polymer latex polymers and clay or other inorganics present). While the size press coating can help to prevent the penetration of the heat seal layer, a subsequent coating also can be applied in order to further smooth the surface (so that no pinholes in the barrier result from pre-existing "high spots") and also to provide smaller pore sizes at the surface to help ensure that the dispersed polymer stays on the surface instead of being dragged in with the water that it is dispersed in. This holdout layer would most likely be a conventional paper coating containing primarily inorganic particles (calcium carbonate or clay) and a small amount of polymer binder to hold the particles together.

Paperboard Substrate

The paperboard substrate 130 can be or can include any paperboard material capable of forming a desired paper container. Paperboard materials suitable for use as the paperboard substrate 130 can have a basis weight of about 60 pounds to about 250 pounds per 3,000 square feet of paperboard substrate or about 120 pounds to about 250 pounds per 3,000 ft$^2$ of paperboard substrate. The basis weight of the paperboard material can be from a low of about 60 lbs, 75 lbs, or 120 lbs to a high of about 200 lbs, 230 lbs, or 250 lbs per square feet of paperboard substrate. The paperboard material can have a thickness from a low of about 125 µm, about 175 µm, about 200 µm, about 225 µm, or about 250 µm to a high of about 350 µm, about 400 µm, about 450 µm, about 500 µm, about 550 µm, or about 600 µm. In another example, the paperboard material can have a thickness of about 185 µm to about 475 µm, about 215 µm to about 425 µm, or about 235 µm to about 375 µm.

As mentioned above, the paperboard substrate 130 can be uncoated or coated prior to the addition of the first and second polymer layers 110, 150. For example, one or both sides of the substrate 130 can be coated with one or more layers including size press, waxes and/or clays. Each coating layer can have a thickness ranging from a low of about 0.002 mm, about 0.005 mm, about 0.01 mm, about 0.03 mm, about 0.05 mm, about 0.07 mm, or about 0.1 mm to a high of about 0.15 mm, about 0.17 mm, about 0.2 mm, about 0.25 mm, about 0.3 mm, or about 0.35 mm.

Commercially available paperboard material that can be used as the paperboard substrate 130 can include, but is not limited to, solid bleached sulfate (SBS) cupstock, bleached virgin board, unbleached virgin board, recycled bleached board, recycled unbleached board, or any combination thereof. For example, SBS cupstock available from Georgia-Pacific Corporation can be used as the second layer 150.

Cup

The coated paperboard 100 can be a blank that is formed into a paper product, such as a bowl, plate, container, tray, platter, deep dish container, fluted product, or cup. The terms "paper product," "paper containers," "paperboard products," and "paperboard containers" are intended to be interchangeable herein. For simplicity and ease of description, embodiments provided herein will be further described with reference to a paper cup as illustrated in FIG. 3.

FIG. 3 depicts a partial cut away perspective view of an illustrative paper cup 300, according to one or more embodiments. The paper cup 300 can include a sidewall 305, a bottom panel or cup bottom 320, and a brim curl 315. Referring to FIGS. 1-3, the blank 100 can have a first or "top" edge 107, a second or "bottom" edge 109, a third or "left" edge 111, and a fourth or "right" edge 113. The first and second edges 107, 109 are opposed to one another and the third and fourth edges 111, 113 are opposed to one another. The blank 100 can be formed into the paper cup 300 having a frusto-conical outer sidewall 305. The third and fourth edges 111, 113 can be overlapped with one another to form the sidewall 305 having a seam 310, the first edge 107 can be curled to form a brim 315, and a bottom panel 320 can be secured to the sidewall 305 at or adjacent to the second edge 109.

The sidewall 305 can be formed by rolling or otherwise placing the third and fourth edges 111, 113 of the coated paperboard 100 depicted in FIG. 1 in contact with one another to form the seam 310. For example, the coated paperboard 100 can be formed around a mandrel to form the seam 310. As such, the first edge 107 can form a first or "top" edge of the sidewall 305 and the second edge 109 can form a second or "bottom" edge of the sidewall 305. The sidewall 305 can be heat sealed to provide a sealed seam 310.

The bottom panel 320 can be disposed on or otherwise secured to the sidewall 305, e.g., proximate or adjacent the second edge of the sidewall, such that the sidewall 305 and the bottom panel 320 define a container volume 530. The bottom panel 320 can be coupled, affixed, joined, fastened, attached, connected, or otherwise secured to the sidewall 305 with an adhesive and/or any other means know in the art including heat sealing. The bottom panel 320 can be coated in a polymeric material capable of forming a seal between the first polymer layer 110 of the coated paperboard 100. For example, the bottom panel 320 can be coated with the second polymer layer 150.

The outer and/or inner surface of the sidewall 305 can include one or more printed patterns that can be applied to the coated paperboard 100. "Printed patterns" and like terminology can refer to ink-printed patterns for aesthetics. Such features, however, can have a functional aspect such as indicating a fill line.

The paper cup 300 can have any suitable container volume 530. For example, the container volume 330 can range from a low of about 20 mL, about 40 mL, about 60 mL, about 80 mL, or about 100 mL to a high of about 120 mL, about 200 mL, about 300 mL, about 400 mL, about 500 mL, about 750 mL, about 1,000 mL, about 1,300 mL, or about 1,500 mL. For example, the container volume 595 can be from about 150 mL to about 500 mL, about 450 mL to about 1,000 mL, about 400 mL to about 900 mL, or about 800 mL to about 1,300 mL.

Any one or more layer 110, 130, 150 of the paperboard 100 can include one or more additives to improve processability or handling. Suitable additives can include, but are not limited to opacifying agents, pigments, colorants, fillers, spacers, crosslinks, surfactants, defoamers, rheology modifiers, slip agents, antioxidants, anti-static agents, moisture barrier additives, gas barrier additives and combinations thereof. Examples of suitable opacifying agents, pigments or colorants are iron oxide, carbon black, aluminum, titanium dioxide ($TiO_2$), calcium carbonate ($CaCO_3$), polybutylene terephthalate (PBT), talc, beta nucleating agents, and combinations thereof.

Slip agents can include higher aliphatic acid amides, higher aliphatic acid esters, waxes, silicone oils, and metal soaps. Such slip agents can be used in amounts ranging from 0.1 to 2 wt % based on the total weight of the layer to which it can be added.

Suitable anti-oxidants can include phenolic anti-oxidants. Anti-oxidants can be generally used in amounts ranging from 0.1 to 2 wt %, based on the total weight of the layer(s) to which it can be added.

Anti-static agents can include alkali metal sulfonates, polyether-modified polydiorganosiloxanes, polyalkylphenylsiloxanes, and tertiary amines. Such anti-static agents can be used in amounts ranging from about 0.05 to 3 wt %, based upon the total weight of the layer(s).

Fillers useful in this invention can include finely divided inorganic solid materials such as silica, fumed silica, diatomaceous earth, calcium carbonate, calcium silicate, aluminum silicate, kaolin, talc, bentonite, clay and pulp.

Suitable moisture and gas barrier additives can include effective amounts of low-molecular weight resins, hydrocarbon resins, particularly petroleum resins, styrene resins, cyclopentadiene resins, and terpene resins.

Such additives can be used in effective amounts, which vary depending upon the property required. To prevent blocking, for example, one or both layers 110, 150 can include one or more anti-block particles or slip additives. A metal, such as aluminum, can be disposed on one or both sides of the paperboard 100 to provide a good barrier property, which is desired for certain food packaging applications. The total amount of additives can include up to about 20 wt % of the layer, but some embodiments can include additives in an amount up to about 30 wt % of the layer.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The following coatings were tested for heat seal initiation temperature.

Coating Materials

BASF Epotal S440: Styrene acrylic with Tg=–27° C. (–17° F.)

Dow Rhoplex P-376—Styrene acrylic with Tg=+19° C. (66° F.)

IGI Barrier-Grip 9471A—Styrene acrylic/PE wax/clay blend with Tg=<0° C. (<32° F.)

Solvay Diofan B204—Vinylidene chloride terpolymer with Tg=10-15° C. (50° F.-59° F.)

Owensboro Daran SL143—Vinylidene chloride terpolymer with Tg=57-59° C. (135° F.-138° F.)

Each coatings was drawn down to the substrate with a #15 Meyer rod and dried in a box oven at 200° F. to 225° F. The substrate was SBS with a pre-coated layer of calcium carbonate (Omya HC60) combined with a small amount of styrene acrylic binder (BASF Acronal S504) in a ratio of about 87 parts calcium carbonate to 13 parts styrene acrylic.

After completely cooling, the heat seal initiation temperature was determined by applying various temperatures using a Sentinel heat sealer at 40 PSI for a 2 second dwell time. The sealed samples were pulled apart and rated for % fiber tear. Heat seal was judged acceptable if fiber tear exceeded 90%. When fiber tear exceeded 90%, the temperature was recorded and is summarized in Table 1 below.

TABLE 1

| | Heat seal temperature | | | | |
|---|---|---|---|---|---|
| | First Layer | Tg of First layer | Second Layer | Tg(s) of Second layer | Heat Seal Initiation Temp |
| Comp. Ex. 1 | Epotal S440 | –17° F. | Epotal S440 | –17° F. | 410° F. |
| Ex. 2 | Epotal S440 | –17° F. | 70/30 blend of Epotal S440 and Rhoplex P-376 | –17° F. +66° F. | 350° F. |
| Comp. Ex. 3 | Barrier Grip 9471A | <32° F. | Barrier Grip 9471A | <32° F. | 445° F. |
| Ex. 4A | Barrier Grip 9471A | <32° F. | 70/30 blend of Barrier Grip 9471A and Rhoplex P-376 | <32° F. +66 F. | 390° F. |
| Ex. 4B | Barrier Grip 9471A | <32° F. | 80/20 blend of Barrier Grip 9471A and Rhoplex P-376 | <32° F. +66 F. | 390° F. |
| Ex. 4C | Barrier Grip 9471A | <32° F. | 90/10 blend of Barrier Grip 9471A and Rhoplex P-376 | <32° F. +66 F. | 390° F. |
| Comp. Ex. 5 | Diofan B204 | 50-59° F. | Epotal S440 | –17° F. | 370° F. |

TABLE 1-continued

Heat seal temperature

| | First Layer | Tg of First layer | Second Layer | Tg(s) of Second layer | Heat Seal Initiation Temp |
|---|---|---|---|---|---|
| Ex. 6 | Diofan B204 | 50-59° F. | 70/30 blend of Epotal S440 and Rhoplex P-376 | −17° F. +66° F. | 270° F. |
| Comp. Ex. 7 | Daran SL143 | 135-138° F. | Epotal S440 | −17° F. | 370° F. |
| Ex. 8 | Daran SL143 | 135-138° F. | 70/30 blend of Epotal S440 and Rhoplex P-376 | −17° F. +66° F. | 200° F. |

As shown in Table 1, the blend of polymer components in the second layer significantly decreased the heat seal initiation temperature, compared to the heat seal temperature between the non-blended (i.e. neat) polymer layers.

The data above suggests that a blended coating could be used for both layers, however, this results in more risk for roll blocking, and introduces risks of materials incompatibilities which can lead to somewhat worse barrier properties. This is illustrated by comparing Cobb test values for the neat and blended versions. Cobb testing is a measure of water uptake (grams/in$^2$) over a given length of time, and was conducted according to TAPPI Standard T441 ("Water absorptiveness of sized (non-bibulous) paper, paperboard, and corrugated fiberboard (Cobb test)"). Since cup applications are contemplated here, the test was run for 30 minutes using heated (185° F.) tap water from a commercial coffee-making machine. The results are reported in Table 2 below.

TABLE 2

Cobb values

| Coating composition | 30 minute Cobb (g/in$^2$) |
|---|---|
| Epotal S440 | 4.8 |
| 70/30 blend of Epotal S440 and Rhoplex P-376 | 7.5 |

As shown in Table 2, the water uptake of the 70/30 blend of Epotal S440 and Rhoplex P-376 was almost twice that of the neat polymer coating (Epotal S440). This suggests that although the polymer blend sealed to itself may provide a lower heat seal initiation temperature, such lower temperature comes at a significant sacrifice—a significant reduction in water barrier properties.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A paperboard blank, comprising:
    a paperboard substrate having a first side and a second side;
    a first polymer layer disposed on at least a portion of the first side of the paperboard substrate; and
    a second polymer layer disposed on at least a portion of the second side of the paperboard substrate, wherein both the first and second polymer layers comprise at least one polymer component that is thermoplastic, and the second polymer layer further comprises a polymer component not present in the first polymer layer that has a glass transition temperature that is at least 5° F. higher than the glass transition temperature of any polymer component of the first polymer layer.

2. The paperboard blank of claim 1, wherein the first and second polymer layers both comprise a styrene acrylic.

3. The paperboard blank of claim 1, wherein the polymer component in the second polymer layer that is not present in the first polymer layer and has a glass transition temperature higher than the polymer components of the first polymer layer is a polyester.

4. The paperboard blank of claim 1, wherein at least one of the first and second side of the paperboard substrate is at least partially coated with clay.

5. The paperboard blank of claim 1, wherein the polymer component in the second polymer layer that is not present in the first polymer layer has a glass transition temperature at least 10° F. higher than the glass transition temperature of any polymer component in the first polymer layer.

6. The paperboard blank of claim 1, wherein the first polymer layer or the second polymer layer comprises a vinylidene chloride terpolymer.

7. The paperboard blank of claim 1, wherein the first polymer layer or the second polymer layer comprises polyvinylidene chloride.

8. The paperboard blank of claim 1, wherein the polymer component in the second polymer layer that is not present in the first polymer layer has a glass transition temperature that is 10° F. to 150° F. higher than the glass transition temperature of any polymer component in the first polymer layer.

9. The paperboard blank of claim 1, wherein the polymer component in the second polymer layer that is not present in the first polymer layer has a glass transition temperature that is 15° F. to 125° F. higher than the glass transition temperature of any polymer component in the first polymer layer.

10. The paperboard blank of claim 1, wherein the polymer component in the second polymer layer that is not present in the first polymer layer has a glass transition temperature that is 32° F. to 83° F. higher than the glass transition temperature of any polymer component in the first polymer layer.

11. A paperboard blank, comprising:
    a paperboard substrate having a first side and a second side;

a first polymer layer disposed on at least a portion of the first side of the paperboard substrate; and a second polymer layer disposed on at least a portion of the second side of the paperboard substrate, wherein both the first and second polymer layers comprise at least one polymer component that is a styrene acrylic, and the second polymer layer further comprises a polymer component that has a glass transition temperature that is at least 15° F. higher than the polymer components of the first polymer layer.

12. The paperboard blank of claim 11, wherein the polymer component in the second polymer layer has a glass transition temperature that is at least 15° F. higher than the polymer components of the first polymer layer is a polyester.

13. The paperboard blank of claim 11, wherein at least one of the first and second side of the paperboard substrate is at least partially coated with calcium carbonate.

14. The paperboard blank of claim 11, wherein the first polymer layer or the second polymer layer comprises a vinylidene chloride terpolymer.

15. The paperboard blank of claim 11, wherein the first polymer layer or the second polymer layer comprises polyvinylidene chloride.

16. A cup, comprising:
a sidewall having a first side and a second side, wherein a first polymer layer is disposed on at least a portion of the first side of the sidewall, and a second polymer layer is disposed on at least a portion of the second side of the sidewall,
wherein both the first and second polymer layers comprise at least one polymer component that is thermoplastic, and the second polymer layer further comprises a polymer component not present in the first polymer layer that has a glass transition temperature that is at least 5° F. higher than the glass transition temperature of any polymer component of the first polymer layer.

17. The cup of claim 16, wherein the first and second polymer layers both comprise a styrene acrylic.

18. The cup of claim 16, wherein the polymer component in the second polymer layer that is not present in the first polymer layer and has a glass transition temperature higher than the polymer components of the first polymer layer is a polyester.

19. The cup of claim 16, wherein at least one of the first and second side of the sidewall is at least partially coated with calcium carbonate.

20. The cup of claim 16, wherein the polymer component in the second polymer layer that is not present in the first polymer layer has a glass transition temperature at least 15° F. higher than the glass transition temperature of any polymer component in the first polymer layer.

21. The cup of claim 16, wherein the first polymer layer or the second polymer layer comprises a vinylidene chloride terpolymer.

22. The cup of claim 16, further comprising a bottom panel secured proximate a lower edge of the sidewall, wherein the second polymer layer is disposed on at least a portion of the bottom panel that is in contact with a lower edge of the first surface of the sidewall.

23. A cup, comprising:
a sidewall having a first side and a second side; and
a bottom panel secured proximate a lower edge of the sidewall, wherein a first polymer layer is disposed on the first side of the sidewall, and a second polymer layer is disposed on at least a portion of the bottom panel that contacts the edge of the sidewall having the first polymer layer disposed thereon, and
wherein both the first and second polymer layers comprise at least one polymer component that is thermoplastic, and the second polymer layer further comprises a polymer component not present in the first polymer layer that has a glass transition temperature that is at least 5° F. higher than the glass transition temperature of any polymer component of the first polymer layer.

24. The cup of claim 23, wherein the first and second polymer layers both comprise a styrene acrylic.

25. The cup of claim 23, wherein the polymer component in the second polymer layer that is not present in the first polymer layer and has a glass transition temperature higher than the polymer components of the first polymer layer is a polyester.

26. The cup of claim 23, wherein at least one of the first and second side of the sidewall is at least partially coated with calcium carbonate.

27. The cup of claim 23, wherein the polymer component in the second polymer layer that is not present in the first polymer layer has a glass transition temperature at least 15° F. higher than the glass transition temperature of any polymer component in the first polymer layer.

28. The cup of claim 23, wherein the first polymer layer or the second polymer layer comprises a vinylidene chloride terpolymer.

* * * * *